Aug. 30, 1927.
J. H. Mac PHERSON
1,641,041
VEHICLE LAMP
Filed Feb. 10, 1925
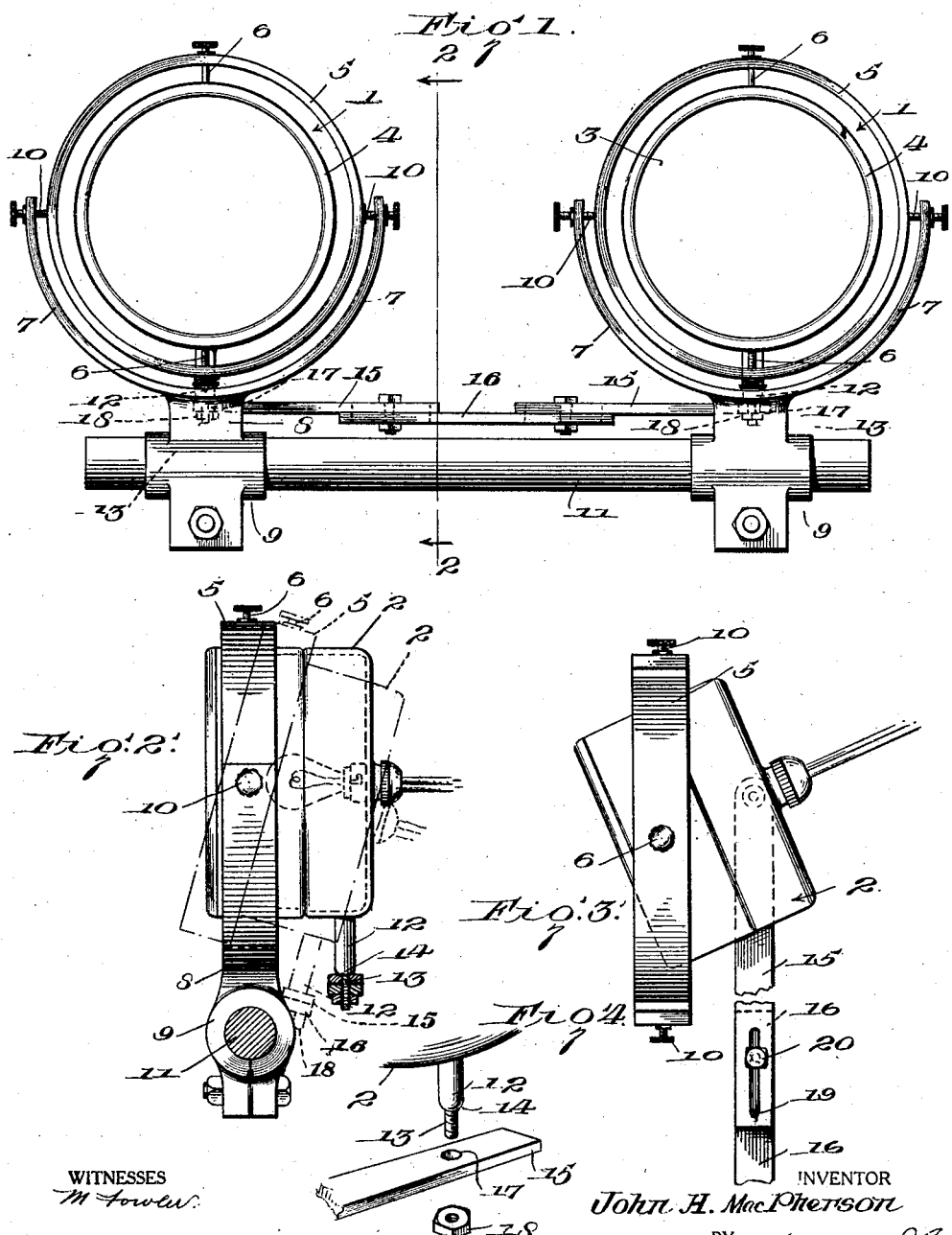
WITNESSES
INVENTOR
John H. MacPherson
BY
ATTORNEYS Patented Aug. 30, 1927.

1,641,041

UNITED STATES PATENT OFFICE.

JOHN HENRY MacPHERSON, OF McKEESPORT, PENNSYLVANIA.

VEHICLE LAMP.

Application filed February 10, 1925. Serial No. 8,233.

My invention relates to improvements in light projecting devices for vehicles, more particularly to means for mounting a pair of headlights on a vehicle, and it consists in the combinations, constructions, and arrangements herein described and claimed.

An object of the invention is the provision of simple, reliable and easily operable means for supporting a pair of headlights on a vehicle and for connecting the headlights so that the rays of light from the headlights can be deflected from a given path in any one of a plurality of directions at the will of the operator.

A further object of the invention is the provision of an arrangement for mounting a pair of headlights on a vehicle and for connecting the headlights so that the headlights can be turned simultaneously about parallel or aligned axes.

Other objects and advantages of the invention will be apparent from the following description, considered in conjunction with the accompanying drawing, in which Figure 1 is a front elevation of a pair of vehicle headlights supported and connected by a construction embodying the invention.

Figure 2 is a section substantially along the line 2—2 of Figure 1.

Figure 3 is a plan view of one of the headlights, and of its supporting means and a portion of a motion transmitting member for connecting the headlight with the other headlight.

Figure 4 is a fragmentary perspective group view showing the lower portion of one of the headlights together with a portion of the motion transmitting member and the means for loosely connecting the motion transmitting member to the headlight.

In Figure 1, I show a pair of headlights, each indicated generally at 1 and each comprising a casing 2 having a lens 3 mounted in the forward end portion of the headlight casing.

The supporting means for each headlight includes an inner gimbal ring 4 which is rigid with the headlight casing and which may be the forward end portion of the headlight casing. The inner gimbal ring 4 is supported within an outer gimbal ring 5 in spaced concentric relation to the latter by means of a pair of aligned vertical pivot pins 6 and therefore the inner gimbal ring 4 and consequently the headlight casing is swingable in the outer gimbal ring about a vertical axis which extends diametrically of the outer gimbal ring. The outer gimbal ring 5 is supported between forks 7 into which the upstanding arm 8 of a bracket 9 is divided, the forks 7 being curved as shown to partially encircle the outer gimbal ring and the connection of the outer gimbal ring with the forks being effected by means of a pair of aligned horizontal pivot pins 10 which are carried by the forks, the outer gimbal ring and therefore the headlight casing being turnable about a horizontal axis which extends diametrically of the outer gimbal ring. The respective brackets 9 are secured detachably as shown in Figure 2 or otherwise if desired on opposite end portions of a horizontal rod 11 so that the upstanding bracket arm 8 will be parallel. The horizontal rod 11 may be rigidly secured to a vehicle body, not shown, in any suitable known manner. Also, it is obvious that the brackets 9 can be secured to the vehicle body with the arms 8 of the bracket upstanding and parallel without the use of the rod 11 and in any suitable known manner.

The rearward end portion of each lamp casing 2 is provided with a depending stud projection 12 having a reduced lower end portion 13, thus producing a shoulder 14 at the juncture of the reduced end portion 13 and the remaining portion of the depending stud projection. The shoulder 14 is convexly curved as shown for a purpose to be presently described. A motion transmitting rod for connecting the stud projections 12 of the two headlights preferably is adjustable as to length and therefore may comprise a pair of end sections 15 and a middle section 16 respectively, each end section having a vertical opening in its outer end portion as indicated at 17 for the section 15 in Figure 4, through which the reduced portion 13 of the adjacent stud projection 12 is adapted to extend loosely, the lower end portion of the reduced portion 13 of the stud projection being threaded for engagement with a nut 18 for preventing displacement of the section of the motion transmitting rod from the stud projection. The inner end portions of the sections 15 are in sliding contact with the end portions of the section 16, the sections 15 sliding on the section 16 and each section 15 being provided with a longitudinal slot 19 through which the shank of a headed clamping screw 20 extends and is in threaded engagement with the underlying section 16 for the purpose of rigidly connecting the sections 15 and 16, with the length of the member 15—16—15 adjusted as desired between the limits set by the opposite ends of the slots 19.

From the foregoing description of the various parts of the device, the operation thereof may be readily understood. The nuts 18 retain the ends of the motion transmitting member 15—16—15 on the reduced end portions 13 of the pendant stud projections 12 without clamping such end portions of the motion transmitting rods against the shoulders 14, whereby axial movement of the motion transmitting rod 15—16—15 to the extension required to cause a desirable turning of the headlight casings about parallel vertical axes is permitted without binding between the end portions of the motion transmitting rod 15—16—15 and the stud projections 12. The forming of the shoulders 14 with convexly curved faces cooperates with the loose connection between the end portions of the motion transmitting rod and the stud projections 12 to permit the axial movement of the motion transmitting rod 15—16—15 just described. When it is desired to swing the headlight casings about a horizontal axis, the rod 15—16—15 is moved bodily in an upward or downward direction. The direction which the rays of light from one of the headlights will take with respect to the direction of the rays of light from the other headlight may be varied initially by adjusting the sections 15 and 16 of the motion transmitting rod and thereafter the headlight casing will be moved simultaneously about either aligned horizontal axes or about parallel vertical axes when the motion transmitting rod 15—16—15 is moved. Any suitable known mechanism, none being shown, can be provided for connecting the rod 15—16—15 with an operating member adjacent to the seat of the vehicle on which the headlights are mounted so that the rod 15—16—15 can be operated from the driver's seat.

It will be manifest that the headlights can be swung about vertical axes to illuminate areas at either side of a roadway for any purpose and that the swinging of the operating rod 15—16—15 upward will cause concentration of the rays of light from the headlight directly in front of the vehicle while swinging of the rod 15—16—15 downward will cause rays of light to be projected a greater distance in advance of the vehicle than is usual.

I claim:—

In combination, a pair of headlight casings, means supporting each headlight casing for swinging movement about a vertical axis and for swinging movement about a horizontal axis, a stud carried by each headlight casing rearwardly of a vertical plane passing through the vertical axis of swinging movement of the headlight casing and also rearwardly of a vertical plane passing through the horizontal axis of swinging movement of the headlight casing, and a single cross connecting rod loosely connected at its ends with said studs and movable bodily in one direction to swing said headlight casings simultaneously about said vertical axis, said cross connecting rod also being movable bodily to swing said headlight casings simultaneously about said horizontal axes, said cross connecting rod comprising a pair of similar end sections and a middle section, the outer ends of the end sections being loosely connected with said studs and the inner end portions of the end sections being adjustably connected with said end portions of said middle section.

JOHN HENRY MacPHERSON.